(12) United States Patent
Waagaard et al.

(10) Patent No.: US 7,466,422 B2
(45) Date of Patent: Dec. 16, 2008

(54) METHOD AND APPARATUS FOR SUPPRESSION OF CROSSTALK AND NOISE IN TIME-DIVISION MULTIPLEXED INTERFEROMETRIC SENSOR SYSTEMS

(75) Inventors: Ole Henrik Waagaard, Trondheim (NO); Erlend Rønnekleiv, Trondheim (NO)

(73) Assignee: Optoplan AS, Trondheim (NO)

( * ) Notice: Subject to any disclaimer, the term of this patent is extended or adjusted under 35 U.S.C. 154(b) by 0 days.

(21) Appl. No.: 11/866,040

(22) Filed: Oct. 2, 2007

(65) Prior Publication Data

US 2008/0018905 A1 Jan. 24, 2008

Related U.S. Application Data

(63) Continuation of application No. 11/056,970, filed on Feb. 11, 2005, now Pat. No. 7,336,365.

(51) Int. Cl.
*G01B 9/02* (2006.01)
(52) U.S. Cl. .................................................. 356/478
(58) Field of Classification Search ......... 356/477–480, 356/483, 450, 481, 482, 484; 398/98, 116
See application file for complete search history.

(56) References Cited

U.S. PATENT DOCUMENTS

| | | | |
|---|---|---|---|
| 4,699,513 A * | 10/1987 | Brooks et al. ............... | 356/478 |
| 4,742,576 A | 5/1988 | McMahon | |
| 4,770,535 A | 9/1988 | Kim et al. | |
| 5,361,130 A | 11/1994 | Kersey et al. | |
| 5,917,597 A | 6/1999 | Hall et al. | |
| 5,982,530 A | 11/1999 | Akiyama et al. | |
| 5,987,197 A | 11/1999 | Kersey | |
| 6,005,995 A | 12/1999 | Chen et al. | |
| 6,097,487 A * | 8/2000 | Kringlebotn et al. ........ | 356/450 |
| 6,452,681 B1 | 9/2002 | Carver et al. | |
| 6,507,679 B1 | 1/2003 | Hodgson et al. | |

(Continued)

FOREIGN PATENT DOCUMENTS

GB 2126820 3/1984

(Continued)

OTHER PUBLICATIONS

Kersey et al., "Fiber Grating Sensors," Aug. 1997, Journal of Lightwave Technology, vol. 15, No. 8, pp. 1442-1463.*

(Continued)

*Primary Examiner*—Hwa S Lee (Andrew)
*Assistant Examiner*—Scott M Richey
(74) *Attorney, Agent, or Firm*—Patterson & Sheridan, LLP

(57) ABSTRACT

Unwanted signal components in time-division multiplexed (TDM) systems may lead to crosstalk and noise if these pulses overlap with signal pulses from an interrogated sensor. The crosstalk and noise are dominated by interference between the signal pulses from the interrogated sensor and the unwanted signal components and can be greatly reduced by suppressing this interference signal. The unwanted signal components may include overlapping pulses originating from different sets of interrogation pulses (repetition periods). Modulating the phase or frequency between the repetition periods so that the unwanted interference signal does not appear at frequencies from which the phase of the interrogated sensor is demodulated suppresses this interference. Other unwanted signal components include leakage light during dark periods of the duty cycle of an interrogation signal. Modulating the phase difference between the interrogation signal and the leakage light suppresses the interference between the leakage light and the interrogation signal.

13 Claims, 6 Drawing Sheets

U.S. PATENT DOCUMENTS

| | | | |
|---|---|---|---|
| 6,571,027 B2 | 5/2003 | Cooper et al. | |
| 6,778,318 B2 | 8/2004 | Sayyah et al. | |
| 6,870,629 B1 | 3/2005 | Vogel et al. | |
| 6,934,034 B2 | 8/2005 | Hall | |
| 7,019,837 B2 * | 3/2006 | Waagaard | 356/478 |
| 7,038,785 B2 | 5/2006 | Hall | |
| 7,076,172 B2 | 7/2006 | Kumar | |
| 7,126,736 B2 | 10/2006 | Itoh et al. | |
| 7,157,693 B2 * | 1/2007 | Thingbo et al. | 250/227.18 |
| 7,268,884 B2 * | 9/2007 | Kringlebotn et al. | 356/477 |
| 7,294,406 B2 | 11/2007 | Canham et al. | |
| 2005/0078316 A1 * | 4/2005 | Ronnekleiv et al. | 356/478 |
| 2005/0271395 A1 * | 12/2005 | Waagaard et al. | 398/189 |

OTHER PUBLICATIONS

Dandridge, A. et al., "Homodyne Demodulation Scheme for Fiber Optic Sensors Using Phase Generated Carrier", IEEE Journal of Quantum Electronics, vol. QE-18, No. 10, Oct. 1982, pp. 1647-1653.

Kersey, A.D. et al., "Time-Division Multiplexing of Interferometric Fiber Sensor Using Passive Phase-Generated Carrier Interrogation", Optic Letters, vol. 12, No. 10, Oct. 1987, pp. 775-777.

Canadian Office Action dated Oct. 17, 2007, Canadian Patent Application No. 2535964.

* cited by examiner

METHOD AND APPARATUS FOR SUPPRESSION OF CROSSTALK AND NOISE IN TIME-DIVISION MULTIPLEXED INTERFEROMETRIC SENSOR SYSTEMS

CROSS-REFERENCE TO RELATED APPLICATIONS

This is a continuation of U.S. patent application Ser. No. 11/056,970 filed Feb. 11, 2005, now U.S. Pat. No. 7,336,365 which is herein incorporated by reference.

BACKGROUND OF THE INVENTION

1. Field of the Invention

The present invention generally relates to time division multiplexed interferometric sensors. More specifically, the present invention relates to interrogating interferometric sensors in a manner that improves signal-to-noise ratios.

2. Description of the Related Art

A interferometric sensor system may comprise a transmitter unit that produces an interrogation signal for the interferometric sensors, a sensor network, and a receiver unit that detects the signals from the sensor network. The sensor network may comprise several optical pathways from its input to its output, and some pairs of optical pathways form sensor interferometers. These optical pathways are called sensor pathways. Each sensor interferometer comprises a sensor and lead paths, the parts of the two sensor pathways that are not common define the sensor, while the common parts define the lead paths. In a fiber optic sensor network the lead paths are called lead fibers. The portion of the lead paths between the transmitter unit and a sensor is called the down-lead path and the portion of the lead paths between a sensor and the receiver unit is called the up-lead path. The portion of the lead paths that are common to both the down-lead path and the up-lead path is called the common lead path, or common lead fiber for a fiber optic sensor network. The sensors interferometer can be Michelson interferometers, Mach-Zender interferometers or Fabry-Perot interferometers. The sensor network can be a number of topologies, including a star network, a ladder network, a transmissive serial array, a serial Michelson array or an inline Fabry-Perot sensor array. The different paths through the sensor network may typically be formed by optical waveguides and splitters like optical fibers, optical splitters, circulators, and other waveguide coupled components, or free space optical paths, mirrors, beam splitters and other bulk components. The time delay difference $\tau_s$ between the two sensor pathways is called the imbalance of that sensor, which is typically equal for all sensors. The sensor phase, which is the phase delay difference between the two sensor pathways, can be made sensitive to some physical property that one wants to measure. Thus, information about the physical property can be found by extracting the phase of the interference between the interrogation signal that has propagated the two sensor pathways.

Time-division multiplexing (TDM) of an interferometric sensor network is a form of pulsed interrogation that is achieved by producing light pulses within the transmission unit and transmitting the pulses into the sensor network in one or more pulse transmission time intervals. In between the pulses there may be time intervals without any transmitted light, which are called dark transmission time intervals. Each pulse transmission time interval has typically a length similar to the imbalance of the interrogated sensors. The interrogation signal is made up from a sequence of TDM repetition periods, where each TDM repetition period comprises a sequence of pulse transmission time intervals and dark transmission time intervals. Typically, the TDM repetition periods have equal length and the delay from the start of the TDM repetition periods to the respective pulse and dark transmission time intervals is fixed. A sequence of pulse transmission time intervals that are positioned equally in consecutive TDM repetition periods is called a pulse transmission time slot. Similarly, a sequence of dark transmission time intervals positioned equally in consecutive TDM repetition periods is called a dark transmission time slot. The following description uses transmission time slot as the collective term for pulse transmission time slot and dark transmission time slot. The signal of a transmission time slot is defined by masking out the interrogation signal during the time intervals that define the transmission time slot. The phase or frequency of the optical signal within a transmission time slot is typically varied.

Signals from two pulse transmission time slots are combined at the receiver unit in a receiver time slot after having propagated the two sensor pathways of a sensor interferometer. The interference signal within this receiver time slot includes information about the sensor phase. One or more receiver time slots are associated with the sensor, and the optical signal in at least one receiver time slot is detected, sampled with a sample rate that is equal to or an integer fraction of the TDM repetition rate and processed to extract a demodulated sensor phase as a measure for the sensor. The bandwidth of the demodulated sensor phase signal is less than the receiver Nyquist bandwidth, which is half the sampling rate. Any component of the sensor phase signal above the receiver Nyquist bandwidth is aliased. Thus, the TDM repetition period must therefore be chosen so that aliasing of the sensor phase signal is avoided. TDM of several sensors is typically achieved by having a different delay from the transmission unit to the receiver unit for each of the sensors so that different sensors are associated with different receiver time slots. A receiver time slot may also include information about the sensor phase of more than one sensor, and a set of receiver time slots can be processed to extract information about the individual sensors, as disclosed in O. H. Waagaard, "Method and Apparatus for Reducing Crosstalk Interference in an Inline Fabry-Perot Sensor Array," U.S. patent application Ser. No. 10/649,588, which is herein incorporated by reference.

A well-known time division multiplexed interrogation technique is the two pulse heterodyne sub-carrier generation technique as disclosed in J. P. Dakin, "An Optical Sensing System," U.K. patent application number 2,126,820A (filed Jul. 17, 1982). The two pulse heterodyne technique repeatedly transmits two interrogation pulses in two pulse transmission time slots. The phase difference between the first and the second pulse from a TDM period to the next is linearly varied with time to produce a differential frequency shift between the two pulse transmission time slots. The signal from the two pulse transmission time slots that has propagated the two sensor pathways interferes within a receiver time slot. The interference signal comprises a component at a sub-carrier frequency equal to the differential frequency shift. The phase of this sub-carrier provides a measure for the sensor phase.

A well-known interrogation method for continuous wave (cw) interrogation of interferometric sensors is the phase generated carrier technique, disclosed in A. Dandrige, et al., "Homodyne Demodulation Scheme for Fiber Optic Sensors Using Phase Generated Carrier," IEEE Journal of Quantum Electronics, 18(10):1647-1653, 1982. The phase generated carrier technique is based on a harmonic bias modulation of the phase of the interference signal, for instance, by modulation of the source phase, resulting in a detected interference signal that has signal components at harmonics of the source modulation frequency. The sensor phase can be determined from a combination of the signal components of several harmonics of the source modulation frequency. This technique can also be used in combination with time-division multiplexing, see A. D. Kersey, et al. "Time-division Multiplexing of Interferometric Fiber Sensor Using Passive Phase-generated Carrier Interrogation," Optics Letters, 12(10):775-777, 1987. The light source may then be pulsed in the same manner as for the two pulse heterodyne sub-carrier generation technique, while the source phase is modulated in the same manner as for the cw phase generated carrier technique. The detector is sampled at the arrival of the reflected pulses, and the sensor phase is calculated from the harmonics of the source modulation frequency.

With one interrogation method specially suited for interrogation of Fabry-Perot sensors, a multiple of interrogation pulses (larger than two) are generated within three or more pulse transmission time slots, see O. H. Waagaard and E. Rønnekleiv, "Multi-pulse Heterodyne Sub-carrier Interrogation of Interferometric Sensors," U.S. patent application Ser. No. 10/862,123, which is herein incorporated by reference. The phases of the different pulse transmission time slots are modulated at different linear rates. This method improves the signal-to-noise ratio because the multiple reflections generated within the Fabry-Perot cavity do not have to fade out between each pair of interrogation pulses as would be the case for two-pulse interrogation methods.

Unwanted light components that have propagated through other optical pathways from the transmitter unit to the receiver unit other than the two sensor pathways may lead to noise in the demodulated sensor phase or crosstalk from other sensors if these light components overlap with the sensor interference signal within the receiver time slots. For each interrogated sensor, the noise contributing pathways are define as all these optical pathways from the transmitter unit to the receiver unit apart from sensor pathways. Since the light components that have propagated through a noise contributing pathway have significantly lower amplitude than the light components that have propagated through the sensor pathways, the noise and crosstalk caused by these unwanted light components can be significantly reduced if the interference between the unwanted light components and the interference signal from the interrogated sensor can be suppressed.

A noise contributing pathways may arise due to discrete reflectors such as reflectors of other sensors, circulators, couplers, connectors, etc., or due to distributed reflectors such as Rayleigh scattering. If TDM is combined with wavelength division multiplexing (WDM), wavelength selective components such as fiber Bragg gratings (FBGs) or WDM-splitters have limited sideband suppression. Thus, the interrogation signal within a certain WDM-channel may propagate optical pathways belonging to a sensor of a different WDM-channel. The delay of a noise contributing pathway may be such that a pulse that has propagated the noise contributing pathway is received by the receiver unit within a receiver time slot that is used to demodulate the sensor phase. This is the case if the difference in delay between the noise contributing pathway and one of the sensor pathways is equal to the delay between two pulse transmission time intervals. If the common lead path to the sensor is longer than the TDM repetition period, such noise contributing pathways may arise due to Rayleigh reflection along the common lead path. The points along the common lead path that give rise to such noise contributing pathways are called collision points.

A noise contributing pathway can also be a sensor pathway of other time-division multiplexed sensors within the same WDM-channel. If there is no light within the dark transmission time slots, these pathways do not contribute with noise and crosstalk on the interrogated sensor since the optical signal from another time-division multiplexed sensor appears in another receiver time slot. However, limited on/off extinction of the interrogation pulses, for instance, due to light leakage during the dark transmission time slots, may give rise to other light components that may interfere with the interference signal of the interrogated sensor. Such unwanted interference may also lead to unwanted demodulated noise and crosstalk. One proposed method for suppression of this interference includes applying a large phase generated carrier modulation with frequency $f_{pgc}$ to a lithium niobate phase modulator during the dark transmission time slots, and thereby moving the signal components due to interference between one of the pulses and leakage light to multiples of $f_{pgc}$, see D. Hall and J. Bunn, "Noise Suppression Apparatus and Method for Time Division Multiplexed Fiber Optic Sensor Arrays," U.S. Pat. No. 5,917,597, 1999. However, the amount of suppression of this interference depends on the time delay between the generated pulse and the leakage light, and there is no suppression when the time delay is $1/f_{pgc}$. Also, a very large voltage signal has to be applied to the phase modulator, which makes this method impractical.

Therefore, there exists a need in the art for a method that reduces the sensitivity to the interference with unwanted light components reflected from other parts of a TDM sensor network than the interrogated sensor.

SUMMARY OF THE INVENTION

Embodiments of the invention generally relate to reducing crosstalk and noise in time-division multiplexed (TDM) systems by suppressing interference signals from unwanted light components that have propagated noise contributing pathways through the sensor network. The unwanted light components may lead to crosstalk and noise if they overlap in time with an optical signal received from an interrogated sensor. Noise and crosstalk are contributed from interference at the receiver unit between optical signals received from the interrogated sensor and unwanted light pulses that have propagated noise contributing pathways. Other contributions may come from interference between signals received from the interrogated sensor and leakage light that has propagated pathways of other time-division multiplexed sensors or other pathways with moderate transmission loss. Noise and crosstalk due to the unwanted interference between the optical signal from the sensor and unwanted light components can be suppressed by modulating the optical phase in the transmission time slots in such a way that the unwanted interference signals are distributed to frequency bands that do not affect the demodulated sensor signal.

In one embodiment of the invention, the optical phase of the transmission time slots is modulated in such a way that unwanted interference between the signal of a pulse transmission slot and a delayed signal of the same or another pulse transmission time slot or a dark transmission time slot is shifted in frequency such that the unwanted interference signal appears outside the frequency bands used for demodulation of the sensor. This allows for suppression of noise and crosstalk from noise contributing pathways that have a delay that differs with several TDM repetition periods from the delay of the sensor pathways, and a largest possible frequency separation between an optical signal from the interrogated sensor and the unwanted interference signal.

The modulation of the optical phase of the transmission time slots can be divided into a low frequency range and a high frequency range. In the low frequency range, the applied phase modulation is essentially equal within a single transmission time interval but changed from one TDM period to the next. The unwanted interference signal is shifted by a frequency smaller than the TDM repetition frequency but away from the frequency bands used for demodulation of the sensor so that the unwanted interference signal can be suppressed by a digital filter after sampling the signal within the receiver time slot. In order to suppress unwanted interference between the optical signal from the interrogated sensor and unwanted light pulses, the optical phase of the pulse transmission time slots is modulated with a phase function that varies quadratically with time. Suppression of unwanted interference between the optical signal from the interrogated sensor and leakage light is achieved by having a frequency shift between the pulse transmission time slots and the dark transmission time slots that is outside the frequency bands used for demodulation of the sensor.

In the high frequency range, the frequency of transmission time slots is shifted from one TDM period to the next by more than the receiver bandwidth of the receiver unit. The frequency of the interference between the optical signal from the sensor and the unwanted light components becomes larger than the receiver bandwidth and can therefore be suppressed by an analog receiver filter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figures 1, 1A:
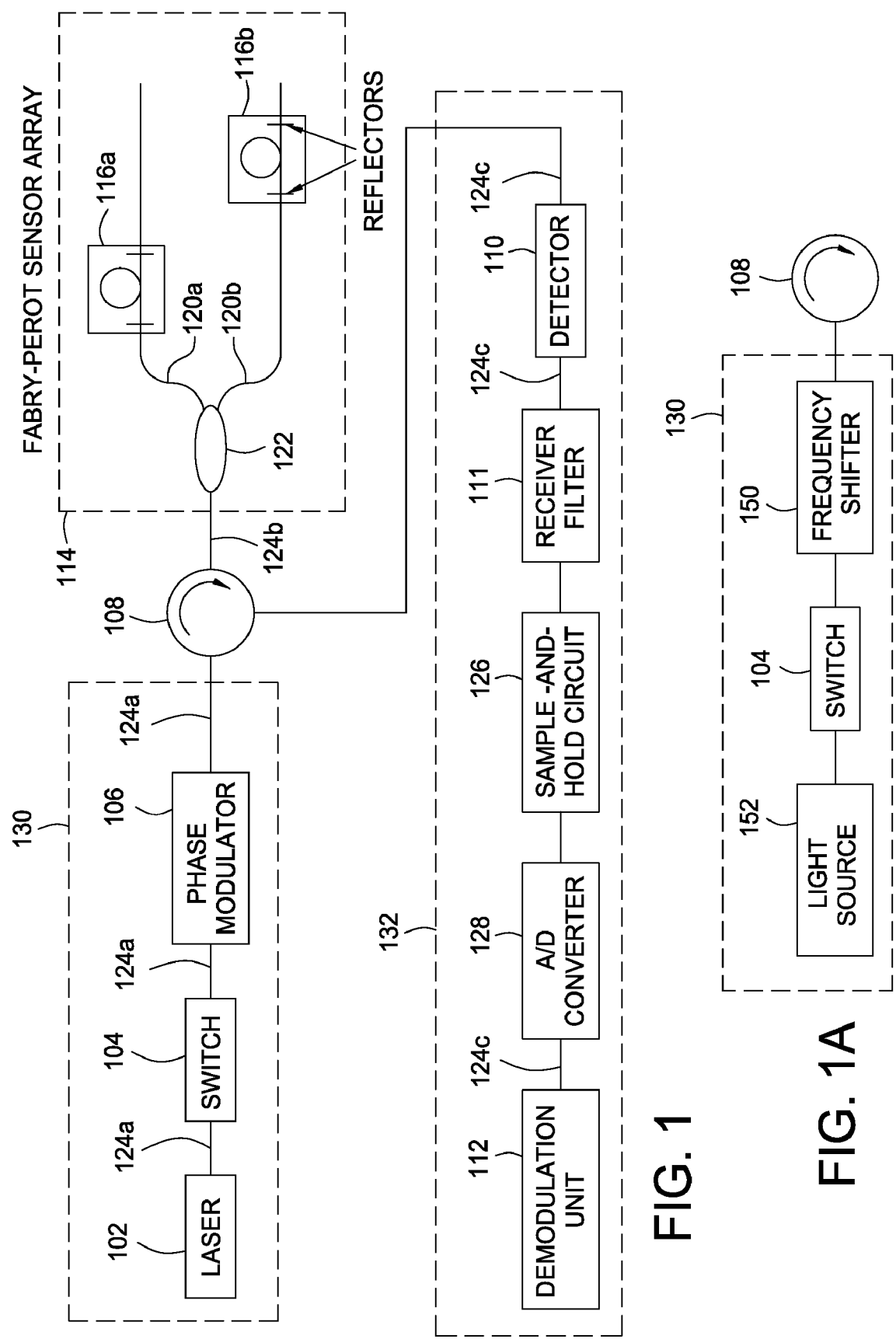
FIG. 1 illustrates schematically a time-division multiplexed (TDM) sensor system with Fabry-Perot sensors that incorporate the principles of the invention.
FIG. 1A shows schematically use of frequency modulation in a Fabry-Perot sensor array.

FIG. 1 illustrates a fiber-optic time-division multiplexing (TDM) interferometric sensor system 100 that incorporates the principles of the present invention. The system 100 includes an array 114 of Fabry-Perot sensors 116, a transmitter unit 130 that produces an interrogation signal for the sensor array 114 and a receiver unit 132 that receives and demodulates the signals from the sensors. The transmitter unit 130 includes a laser 102, a switch 104, and a phase modulator 106, while the receiver unit 132 comprises a detector 110, a receiver filter 111 that suppresses frequency components in the detected optical signal that are outside the band required for demodulation of the sensors, a sample-and-hold circuit 126, an analog to digital (A/D) converter 128 and a demodulation unit 112 that extracts the phase of the individual sensors 116. The Fabry-Perot sensors 116a and 116b are individually formed on optical fibers 120a and 120b that are coupled together by a splitter 122 forming a star network topology. A fiber 124b is connected to a circulator 108 which separates a lead fiber into down-lead fibers 124a and up-lead fibers 124c such that the fibers 124a-c optically couple together elements of the system 100. The fibers 124a, 124b and 124c are connected to the circulator so that the interrogation signal from the transmission unit 130 is directed towards the sensor array 114 and so the reflected signal from the sensor array is directed towards the receiver unit 132. A common lead fiber of sensor 116a (116b) is formed by the fiber 124b and the portion of the fiber 120a (120b) between the coupler 122 and the sensor. Accordingly, a noise contributing fiber for the two sensors 116a and 116b are formed by the fibers 124b, 120a and 120b.

While FIG. 1 illustrates the use of the laser 102 and the phase modulator 106, the principles of the present invention can be implemented as shown in FIG. 1A. FIG. 1A shows a transmitter unit 130 with a frequency shifter 150, such as a Bragg cell, which sweeps the frequency of the light from the laser 102. Additionally, while FIGS. 1 and 1A show interrogation of Fabry-Perot type interferometers, principles of the invention are highly suited for interrogation of other interferometer types, such as, for example, Michelson and Mach-Zender based interferometer topologies.

Figure 2:
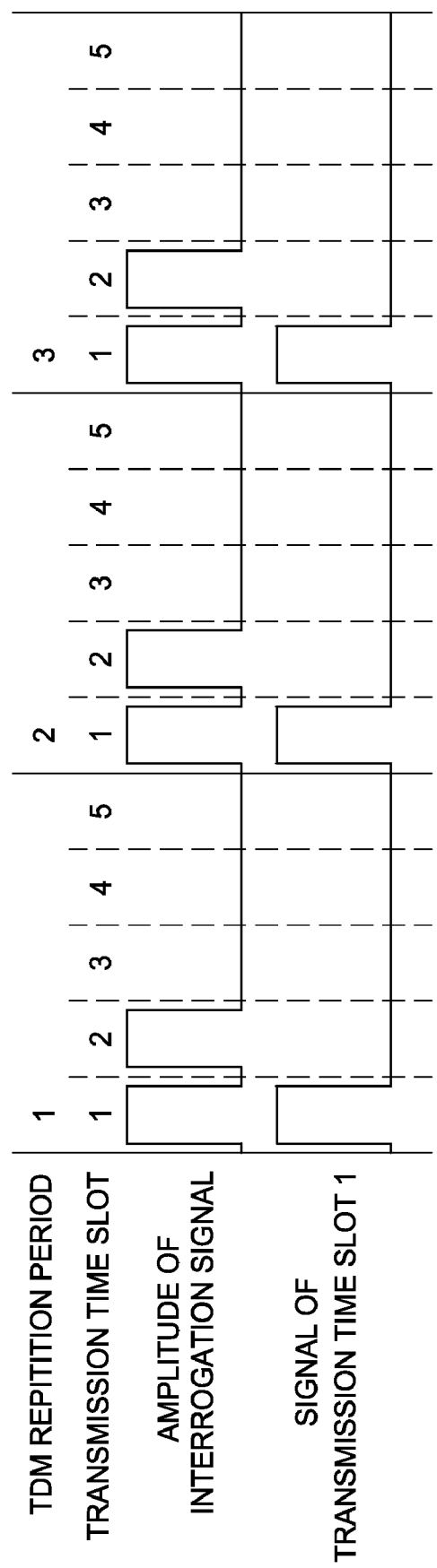
FIG. 2 illustrates an interrogation signal used with two pulse heterodyne sub-carrier generation.

FIG. 2 shows aspects of TDM where the laser 102 outputs light with a periodic intensity pattern and with a repetition period T called a TDM repetition period. The TDM repetition period is divided into transmission time slots of a length equal to the sensor delay imbalance $\tau_s$. A sequence of two or more interrogation pulses are generated in two or more transmission time slots by switching on and off the laser 102 directly or by using the switch 104. For the illustrated embodiment, the repetition period is divided into five transmission time slots, where time slots one and two are pulse transmission time slots while three, four and five are dark transmission time slots.

The signal of a certain transmission time slot is formed by masking out the portion of the interrogation signal within the transmission time slot. This is done by multiplying the interrogation signal with a signal that is one during the transmission time slot and zero in all other time slot. The duty-cycle of the laser 102 is defined as the fraction of time in which the laser 102 is turned on. The duty-cycle depends on the number of the sensors 116 multiplexed and the separation between the sensors 116. Pulses propagating a sensor path and a reference path of one of the sensors 116 interfere at the receiver producing optical power amplitudes that depend periodically on the phase delay difference between the two paths. The phase delay varies due to a response from a measurand.

Figure 3:
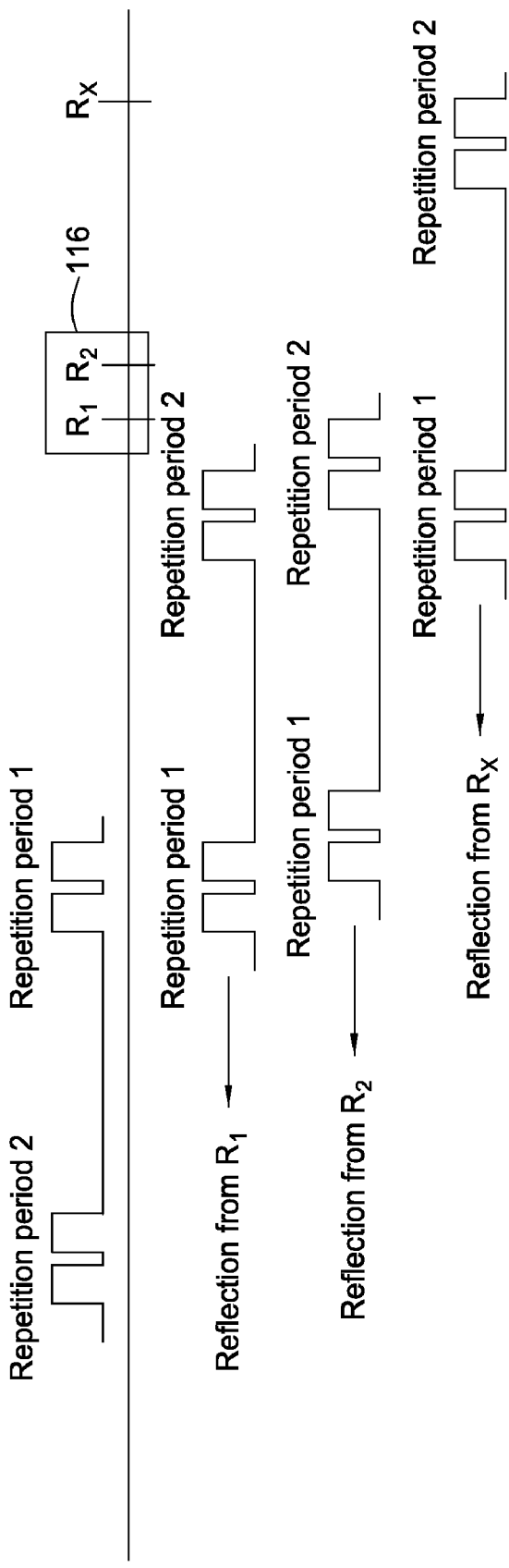
FIG. 3 illustrates reflection of TDM interrogation pulses from a sensor with two reflectors $R_1$ and $R_2$ and an unwanted reflector $R_x$.

FIG. 3 shows an unwanted reflector $R_x$ and first and second reflectors $R_1$ and $R_2$ of the sensor 116 being interrogated. The overlapping pulses reflected from the reflectors $R_1$ and $R_2$ are reflections of interrogation pulses transmitted in the same TDM repetition period, while the pulses reflected from the unwanted reflector $R_x$ are reflections of interrogation pulses transmitted in another TDM repetition period. When the dual-pass delay $\tau$ between the unwanted reflector $R_x$ and one of the reflectors $R_1$ or $R_2$ is equal to a multiple of the TDM repetition period T, pulses reflected from the unwanted reflector $R_x$ and the sensor 116 overlap in time at the receiver and the interference between the reflection from the sensor 116 and the unwanted reflector $R_x$ may give rise to noise or crosstalk on the demodulated signal from the sensor 116. Accordingly, unwanted reflectors positioned both before and after the sensor 116 may give rise to noise and crosstalk on the sensor.

Figure 4:
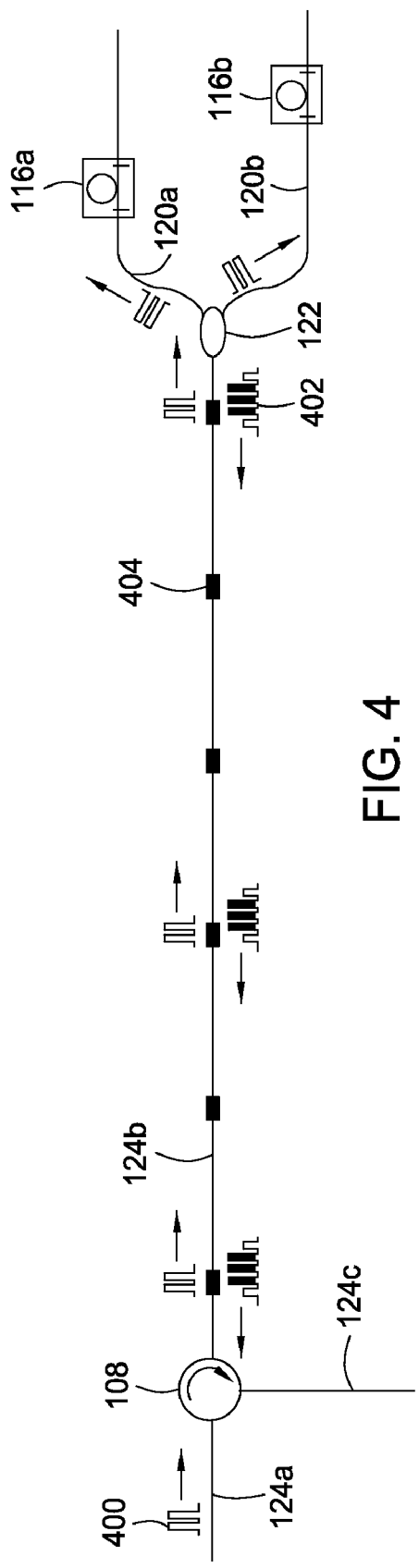
FIG. 4 illustrates collision points along a common lead fiber where spurious reflectors may give rise to unwanted interference signals at a detector.

FIG. 4 shows that reflections in the common lead fiber 124b leading to interference between pulses originating from different TDM repetition periods appear at positions where the interrogation pulses propagating towards the sensors 116 collide with the reflected signal from the sensors 116. Weak reflections in the up-lead fiber 124a and down-lead fiber 124c to a first order approximation do not contribute to noise or errors in the detected and demodulated signals. The parts of the common lead fiber 124b where the pulses collide define collision points 404. Although not shown in the figure, there are also collision points on fibers 120a and 120b. The distance between the collision points 404 is defined as $c/(2n) \cdot T$, where c is the speed of light and n is the refractive index of the fiber. This means that the total number of collision points 404 per sensor reflector on the common lead fiber 124b is $k_{max} = \lfloor T_f / T \rfloor$, where $T_f$ is the maximum difference in delay between a sensor pathway and a noise contributing pathway. Here, $\lfloor \cdot \rfloor$ denotes rounding down to the nearest integer. Thus, suppression of the interference only requires suppressing the interference between the reflections from two interrogation pulses that are less than or equal to $k_{max}$ TDM repetition periods apart.

For $\tau$ larger than the pulse coherence time, the pulses reflected from the unwanted reflector $R_x$ do not originate from the same repetition period as the reflectors $R_1$ and $R_2$. This allows for suppression of crosstalk and noise by modulation of the phase or frequency of the interrogation pulses from TDM repetition period to TDM repetition period so that the interference between the pulses from the interrogated sensor 116 and the unwanted pulses does not include frequency components that are used to demodulate the sensor 116. By modulating the phase of the interrogation signal, the interference between the signal transmitted in one pulse time slot and the signal transmitted in the same or another pulse time slot delayed by more than the sensor imbalance provides a frequency outside the frequency bands used for demodulation of the sensors 116. Furthermore, modulating the phase of the interrogation signal so that the interference between the signal transmitted in one pulse time slot and any signal transmitted in the dark time slots provides a frequency outside the frequency bands used for demodulation of the sensors 116 and thus enables suppression of noise due to leakage during the dark time slots.

The following embodiments described assume that a variant of the two pulse heterodyne sub-carrier generation is used. However, other embodiments can also be used with other interrogation schemes such as phase-generated carrier interrogation and multi-pulse heterodyne sub-carrier interrogation.

In one embodiment, the phase difference between the two interrogation pulses in the pulse time slots is varied linearly with time so that the sensor phase can be found from the sequence of reflected pulses from the sensor 116 by processing information within a frequency band centered at the sub-carrier frequency $f_{sc}$ and with a bandwidth 2BW. The noise or crosstalk due to the interference between an unwanted light component and a pulse from an interrogated sensor is suppressed if the phase or frequency modulation of the interrogation pulses is such that the interference does not appear in the frequency band $f_{sc} - BW \leq f \leq f_{sc} + BW$. Signal components outside this frequency band can be removed either by the analog receiver filter 111 (shown in FIG. 1) or a digital filter within the demodulation unit 112.

In some applications, the interrogation signal may be divided into different channels that are interleaved in the time domain so that the sampling period $T_s$ of each channel is a multiple of the TDM repetition period T. One example of such interleaving is the polarization-resolved interrogation method based on switching the polarization states of the interrogation pulses described in O. H. Waagaard and E. Rønnekleiv, "Method and Apparatus for Providing Polarization Insensitive Signal Processing for Interferometric Sensors," U.S. patent application Ser. No. 10/650,117, which is herein incorporated by reference. In this example, the repetition periods are divided into four polarization channels that are defined by the polarization states of the two interrogation pulses. The polarization channels are sequentially interrogated so that within P=4 repetition periods all polarization channels are interrogated. In general, the repetition periods may be divided into P≧1 interleaved channels, where P is an integer. The sampling period for each interleaved channel becomes $T_s = PT$.

The allowed frequencies range can be divided into a low-frequency (f<RBW) range and a high-frequency range (f>RBW), where RBW is the bandwidth of the receiver filter 111, which must be larger than $1/(2\tau_s)$ in order to detect the individual pulses.

Figure 6:
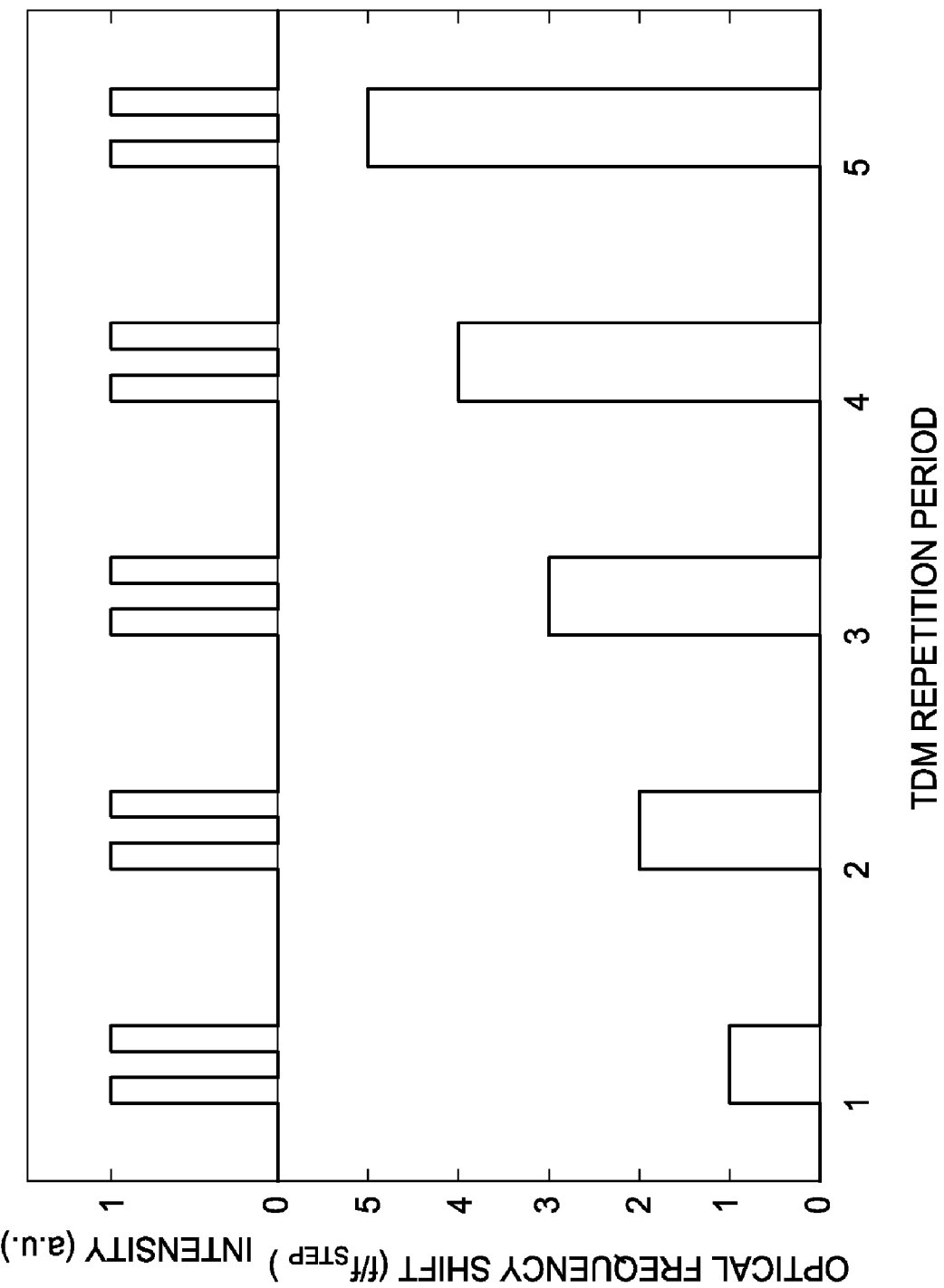
FIG. 6 illustrates frequency shifts having $f_{step}$>RBW applied to interrogation signals to suppress interference between reflections of interrogation pulses originating from different TDM-periods and an interrogation pulse and reflected leakage light.

In one embodiment of the invention where the unwanted interference signal is shifted to the high-frequency range, the optical frequency is shifted from repetition period to repetition period so that the difference in frequency between any two pulses in $k_{max}$ subsequent TDM repetition periods is larger than RBW. FIG. 6 shows how the interrogation signal can be shifted in frequency in steps that are larger than RBW. Interference between reflected interrogation pulses originating from different repetition periods produce frequencies larger than RBW. The receiver filter removes these interference signals. The required frequency modulation can be achieved by modulation of the phase using an electro-optical modulator 106 as shown in FIG. 1, by using a frequency shifter such as an acousto-optical modulator 150 as shown in FIG. 1A, or by tuning the frequency of the light source. The frequency shift is reset to $f_{step}$ after minimum $k_{max}$ repetition periods.

In FIG. 6, the optical frequency shift of leakage light that may occur in the time intervals when the intensity nominally should be zero is kept at zero, and it is therefore different from the frequency of any of the interrogation pulses. This means that the interference between reflected leakage light and reflected interrogation pulses is also suppressed since the frequency difference is larger than RBW.

Figure 5:
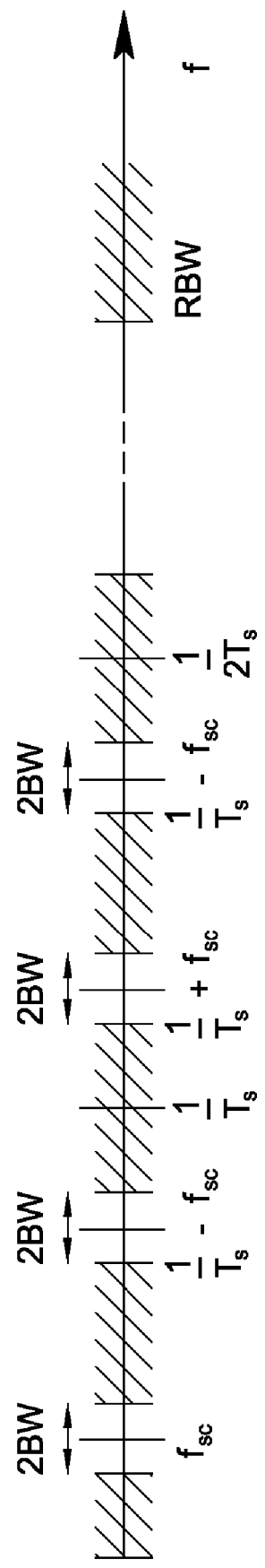
FIG. 5 shows a frequency axis where frequencies of signals due to interference between signal pulses from an interrogated sensor and unwanted pulses appear in a hatched part of the frequency axis that is filtered in order suppress crosstalk and noise.

In another embodiment, the unwanted interference signal is shifted to the low-frequency range by varying the optical phase of the interrogation pulses from repetition period to repetition period in such a manner that the interference between pulses reflected from the interrogated sensor and unwanted pulse reflections is shifted to a frequency that is outside the frequency band $f_{sc} \pm BW$ that is used for the demodulation. The available frequency range to where the unwanted interference signal components can be shifted is limited by the sampling period of the individual sampling channels, $T_s=PT$, and the bandwidth BW of the signal from the interrogated sensor. All frequency components larger than the receiver Nyquist frequency $1/(2T_s)$ are aliased to the frequency in the range below $1/(2T_s)$ due to the sampled nature of the pulses and the receiver sampling. Crosstalk and noise caused by interference between pulses reflected from an interrogated sensor and pulses reflected from an unwanted reflector are therefore suppressed if the phase modulation between repetition periods is such that the unwanted interference signals do not appear at frequencies f in the ranges $$\frac{k}{T_s} - f_{sc} - BW \le f \le \frac{k}{T_s} - f_{sc} + BW \quad (1)$$

$$\frac{k}{T_s} + f_{sc} - BW \le f \le \frac{k}{T_s} + f_{sc} + BW,$$

where k is an integer larger than or equal to zero. These bands are the non-hashed parts of the frequency axis in FIG. 5.

The n'th repetition period in a TDM sampling sequence corresponds to the m'th point in the sampling sequence of the p'th (p=0, . . . ,P−1) sampling (interleaved) channel so that n=Pm+p. The phase of the interrogation pulses in the first and second transmission time slot are $$\phi_1(n) = \phi_1^p(m) = \phi_{ns}(n) - (2-\mu)\phi_{sc}(n) \quad (2a)$$

$$\phi_2(n) = \phi_2^p(m) = \phi_{ns}(n) + \mu\phi_{sc}(n), \quad (2b)$$

respectively, where $0 \ge \mu \ge 2$ is a constant, $\phi_{ns}$ is the modulation that provides noise suppression from unwanted reflections and $\phi_{sc}$ is the modulation that provides the sub-carrier, and they are given by $$\phi_{ns}(n) = \phi_{ns}^p(m) = n^2\pi f_1 T = (Pm+p)^2\pi f_1 T \quad (3a)$$

$$\phi_{sc}(n) = \phi_{sc}^p(m) = m\pi f_{sc}T_s + \phi_0^p/2. \quad (3b)$$

The phase difference between the two transmission time slots is $\phi_2^p(m) - \phi_1^p(m) = 2\phi_{sc}^p(m) = m2\pi f_{sc}T_s + \phi_0^p$. The freedom to choose μ in Equations (2a) and (2b) enables selection so that the sub-carrier modulation is either on the first pulse (μ=0), on the second pulse (μ=2) or both (μ=1). Selection of the frequency $f_1$ is discussed below. If the phase offset of the interleaved channels are chosen as $\phi_0^p = p2\pi f_{sc}T$, then $\phi_{sc}(n) = n\pi f_{sc}T$, and the phase difference between the two transmission time slots varies linearly with n. The phase offset $\phi_0^p$ may be removed from the demodulated phase signal by subtraction. In the following discussions, it is assumed $\phi_0^p = 0$, so that $\phi_{sc}^p(m) = \phi_{sc}(m), \forall p$.

The interference between reflectors $R_1$ and $R_2$ in interleaved channel p is given by $$I^p(m) = R_1 I_2 + R_2 I_1 + 2V^p(m)\sqrt{R_1 R_2 I_1 I_2} \cos(m2\pi f_{sc}T_s + \phi_s^p(m)) \quad (4)$$

where $I_1$ and $I_2$ are the intensities of the two interrogation pulse, $V^p(m)$ is the visibility of the interference and $\phi_s^p(m)$ is the sensor phase. The complex reflection response of interleaved channel p, $X_p(m) = r_p(m)\exp[i\phi_s^p(m)]$, where $r_p(m) = 2V^p(m)\sqrt{R_1 R_2 I_1 I_2}$, can be found from the sequence of detected pulses from a sub-carrier with frequency $f_{sc}$. From the P complex values $X_p(m), p=0, \ldots, P-1$, the sensor phase can be calculated.

The dual-pass delay between the reflectors $R_1$ and $R_x$ is one TDM repetition period in FIG. 3. In order to analyze the interference between the reflections from $R_1, R_2$ and $R_x$ in a more general case, the dual-pass delay difference between the reflectors $R_1$ and $R_x$ is set to k=Pj+q(q=0, 1, . . . P−1) times the TDM repetition period. Note that the following discussion applies when the dual-pass delay difference differs with less than the pulse coherence length from k times the TDM repetition period. Pulses reflected from $R_x$ appear in the same receiver time slot as the interference signal from the sensor. There are two unwanted interference components within this receiver time slot caused by interference with reflections from the unwanted reflector $R_x$. The first component is caused by the interference between pulses originating from the second pulse transmission time slot reflected from the first reflector $R_1$ and pulses originating from the same pulse transmission time slot reflected from the unwanted reflector $R_x$ and delayed by k TDM repetition periods. The second component is the interference between pulses originating from the first pulse transmission time slot reflected from the second reflector $R_2$ and pulses originating from the second pulse transmission time slot and delayed by k TDM repetition periods reflected from the unwanted reflector $R_x$. The interference phase of these two components can be expressed as, $$\begin{aligned}
\phi_2^p(m) - \phi_2^{p-q}(m-j) + & \\
\phi_x^p(m) + \phi_s^p(m) &= \phi_{ns}(n) - \phi_{ns}(n-k) + \mu\phi_{sc}(m) - \\
& \mu\phi_{sc}(m-j) + \phi_x^p(m) + \phi_s^p(m) \\
&= [n^2 - (n-k)^2]\pi f_1 T + \mu[m - (m-j)] \\
& \pi f_{sc}T_s + \phi_x^p(m) + \phi_s^p(m) \\
&= mk2\pi f_1 T_s + \phi_x^p(m) + \phi_s^p(m) - \alpha_k^p + \mu\beta_j
\end{aligned} \quad (5a)$$

$$\begin{aligned}
\phi_1^p(m) - \phi_2^{p-q}(m-j) + \phi_x^p(m) &= \phi_{ns}(n) - \phi_{ns}(n-k) - (2-\mu)\phi_{sc}(m) - \\
& \mu\phi_{sc}(m-j) + \phi_x^p(m) \\
&= [n^2 - (n-k)^2]\pi f_1 T + [-(2-\mu)m - \\
& \mu(m-j)]\pi f_{sc}T_s + \phi_x^p(m) \\
&= mk2\pi f_1 T_s - m2\pi f_{sc}T_s + \phi_x^p(m) - \alpha_x^p + \\
& \mu\beta_j.
\end{aligned} \quad (5b)$$

Here, $\alpha_k^p = k(k+2p)\pi f_1 T$, $\beta_j = j\pi f_{sc}T_s$, and $\phi_x^p(m)$ is the phase delay difference between the second reflector $R_2$ and the unwanted reflector $R_x$. $\phi_x^p(m)$ is assumed to be slowly varying comparable to the receiver Nyquist frequency. Thus, the interference components in (5a) and (5b) are confined to frequency bands centered around $kf_1$ and $f_{sc} - kf_1$.

While not shown in the figures, noise and crosstalk can also appear if the dual-pass delay between the second reflector $R_2$ and the unwanted reflector $R_x$ is equal to k=Pj+q(q=0, 1, . . . P−1) times the TDM repetition period. In this case, the signal from the sensor includes the interference between pulses originating from the second pulse transmission time slot reflected from the first reflector $R_1$ and pulses originating from the first pulse transmission time slot reflected from the unwanted reflector $R_x$ and the interference between pulses originating from the first pulse transmission time slot reflected from the second reflector $R_2$ and pulses originating from the first pulse transmission time slot reflected from the unwanted reflector $R_x$. The phase of these two interference components is given as, $$\begin{aligned}\phi_2^p(m) - \phi_1^{p-q}(m-j) + \\ \phi_x^p(m) + \phi_s^p(m)\end{aligned} = \phi_{ns}(n) - \phi_{ns}(n-k) + \mu\phi_{sc}(m) + \quad (6a)$$

$$(2-\mu)\phi_{sc}(m-j) + \phi_x^p(m) + \phi_s^p(m)$$

$$= [n^2 - (n-k)^2]\pi f_1 T + [\mu m + (2-\mu)(m-j)]$$

$$\pi f_{sc} T_s + \phi_x^p(m) + \phi_s^p(m)$$

$$= mk2\pi f_1 T_s + m2\pi f_{sc} T_s \phi_x^p(m) +$$

$$\phi_s^p(m) - \alpha_k^p - (2-\mu)\beta_j$$

$$\phi_1^p(m) - \phi_1^{p-q}(m-j) + \phi_x^p(m) = \phi_{ns}(n) - \phi_{ns}(n-k) - (2-\mu) \quad (6b)$$

$$\phi_{sc}(m) + \mu\phi_{sc}(m-j) + \phi_x^p(m)$$

$$= [n^2 - (n-k)^2]\pi f_1 T + (2-\mu)[-m +$$

$$(m-j)]2\pi f_{sc} T_s + \phi_x^p(m)$$

$$= mk2\pi f_1 T_s + \phi_x^p(m) - \alpha_k^p - (2-\mu)\beta_j.$$

In this case, the two interference components are confined to frequency bands centered around $kf_1$ and $f_{sc}+kf_1$.

The two collision points with delays that differ by k times the TDM repetition period from the delays of $R_1$ and $R_2$ give rise to components in the detected signal at beat frequencies $kf_1$, $f_{sc}-kf_1$ and $f_{sc}+kf_1$. Beat frequencies that are larger than $1/(2T_s)$ are aliased. In a preferred embodiment, the subcarrier frequency is chosen as $f_{sc}=1/(N_p T_s)$, where $N_p$ is an integer larger than 2. After aliasing to the Nyquist frequency range $[0,1/(2T_s)>$, the beat signal frequencies become, $$f_a(k) = |\mathrm{mod}(kf_1 + N_p f_{sc}/2, N_p f_{sc}) - N_p f_{sc}/2)| \quad (7a)$$

$$f_b(k) = |\mathrm{mod}(f_{sc} - kf_1 + N_p f_{sc}/2, N_p f_{sc}) - N_p f_{sc}/2)| \quad (7b)$$

$$f_c(k) = |\mathrm{mod}(f_{sc} + kf_1 + N_p f_{sc}/2, N_p f_{sc}) - N_p f_{sc}/2)|. \quad (7c)$$

$f_1$ should be chosen such that neither $f_a(k)$, $f_b(k)$ nor $f_c(k)$, $k=1, 2, \ldots k_{max}$ appears in the frequency range between $f_{sc}-BW$ and $f_{sc}+BW$. The separation between $f_{sc}$ and the beat frequency that is closest to $f_{sc}$ is defined as $f_{sep}$. In general, $f_{sep}$ should be as large as possible to avoid overlap between the beat signal band and the subcarrier band. The choice of frequency $f_1$ that gives the largest possible value for $f_{sep}$ is found by setting $f_a(k_{max}+1)=f_{sc}$ in Equation (7a). This equation has solutions $f_1=lf_{sep}$ where $1 \leq k_{max}$ is an integer that has no common divisor with $k_{max}+1$, and $$f_{sep} = \frac{f_{sc}}{k_{\max}+1} = [(k_{\max}+1)N_p T_s]^{-1}. \quad (8)$$

Accordingly, $f_{sep}$ is maximum if $N_p$ is as small as possible, i.e., $N_p=3$ should be chosen.

Figure 7:
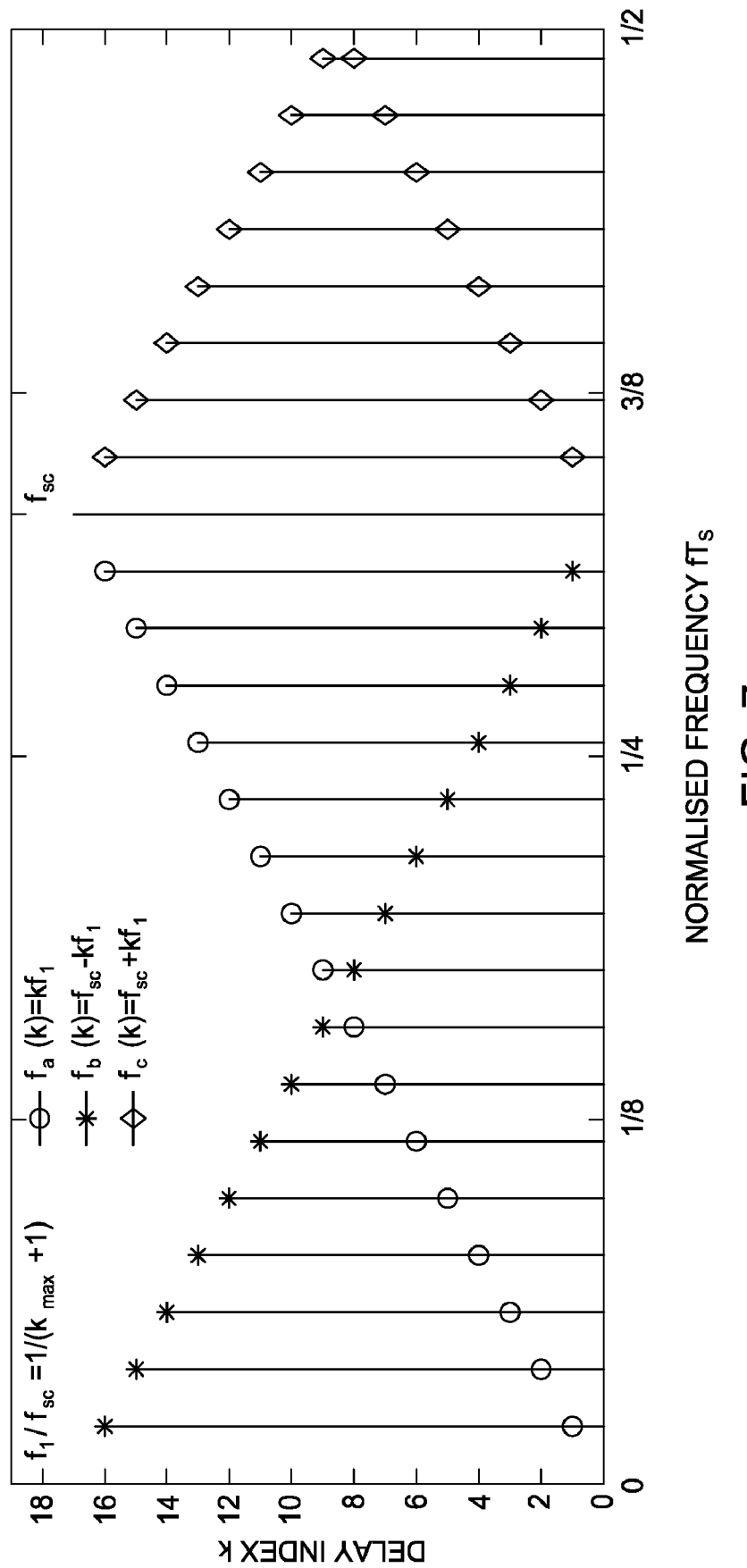
FIG. 7 shows generated beat frequencies formed by interference between a reflection from a collision point and a reflection from a sensor where the collision points are at distances of $kT \cdot 2n/c$, $k=1, \ldots, 16$ away from the sensor.

FIG. 7 shows generated beat frequencies due to interference between the reflection from the collision points and the reflection from the sensor with $k_{max}=16$ and $N_p=3$. With $l=1$, the frequencies that are closest to $f_{sc}$ are $f_b(1)$, $f_c(1)$, $f_b(k_{max})$ and $f_c(k_{max})$. In some cases, it might be preferable to move $f_b(1)$ and $f_c(1)$ further away from $f_{sc}$. This is achieved by selecting $l>1$.

The interference between the leakage light reflected from another time-division multiplexed sensor and reflection of the interrogation pulses from the interrogated sensor can also be suppressed by modulating the difference between the phase of the pulse transmission time slots and the phase of the dark transmission time slots, $\phi_{off}$. By setting $\phi_{off}(n)=\phi_{ns}(n)$ and using Equation (2), the phase of the interference between the first or second pulse generated in TDM repetition period n, respectively, and the leakage light generated in TDM repetition n-k may be expressed as $$\phi_1(n) - \phi_{off}(n-k) + \phi_{x1}(n) = \phi_{ns}(n) - \phi_{ns}(n-k) - \quad (9a)$$

$$(2-\mu)\phi_{sc}(n) + \phi_{x1}(n)$$

$$= mk2\pi f_1 T_s - (2-\mu)m\pi f_{sc} T_s +$$

$$\phi_{x1}(n) + \alpha_k^p$$

$$\phi_2(n) - \phi_{off}(n-k) + \phi_{x2}(n) = \phi_{ns}(n) - \phi_{ns}(n-k) + \quad (9b)$$

$$\mu\phi_{sc}(n) + \phi_{x2}(n)$$

$$= mk2\pi f_1 T_s +$$

$$\mu m\pi f_{sc} T_s +$$

$$\phi_{x2}(n) + \alpha_k^p$$

where $\phi_{x1}(n)$ and $\phi_{x2}(n)$ are the physical phase difference between the interfering components and $a_k^p$ is the same as in Equations (5a) and (5b). It is possible to choose $\mu$ and $f_1$ so that the interference between signals received from the interrogated sensor and leakage light that has propagated pathways of other time-division multiplexed sensors or other pathways with moderate transmission loss appears at a frequency different from the sub-carrier frequency $f_{sc}$. In most cases the difference in delay between the time-division multiplexed sensors is less than the TDM repetition period. The interference between the leakage light and the interrogation pulses from the same TDM period (k=0) appears at a frequencies $\mu f_{sc}$ and $(2-\mu)f_{sc}$ which is different from $f_{sc}$ when $\mu$ is different from 0 or 2. Note that the interference between interrogation pulses and leakage light can be suppressed also when $\phi_{off}(n)=\phi_{ns}(n)=0$, i.e., no modulation is applied to suppress interference between pulses originating from different TDM repetition periods. In a preferred embodiment, $\mu=1$ may be chosen so that $$\phi_1(n) = \phi_{ns}(n) - \phi_{sc}(n) \quad (10a)$$

$$\phi_2(n) = \phi_{ns}(n) + \phi_{sc}(n). \quad (10b)$$

Then, the interference between the leakage and the interrogation pulses from the same TDM repetition period appears at half the sub-carrier frequency. If $f_{sc}>4BW$, the interference between the interference pulses and the leakage light does not give any contribution in the signal band from which the sensor phase is extracted, and can therefore be filtered out by any appropriate digital filter.

With the phase modulation scheme described in Equations (9) and (10), $\phi_{sc}$ must be modulated two sub-carrier periods before the phase can be reset. This means that the maximum voltage applied to the phase modulator is twice the maximum voltage when the crosstalk due to leakage is not suppressed. However, $\phi_{sc}$ can be reset every sub-carrier period if a square wave pattern with period that is half the sub-carrier period and amplitude $\pi/2$ to is added to $\phi_{off}$:

$$\phi_{off}(n) = \phi_{ns}(n) + \frac{\pi}{2} rect\left(\frac{n}{2PN_p}\right), \quad (11)$$

where $$rect(x) = \begin{cases} 1 & x - \lfloor x \rfloor < 0.5 \\ -1 & \text{otherwise.} \end{cases} \quad (12)$$

Thus, the reset of $\phi_{sc}(n)$ is compensated by a phase shift of $\pi$ in $\phi_{off}$, leading to an interference signal between the leakage light and one of the two pulses that are periodic with half the sub-carrier period.

While the foregoing is directed to embodiments of the present invention, other and further embodiments of the invention may be devised without departing from the basic scope thereof, and the scope thereof is determined by the claims that follow.

The invention claimed is:

1. A method of interrogating sensor interferometers of an optical network comprising multiple optical pathways from a transmitter unit to a receiver unit, wherein pairs of optical pathways form the sensor interferometers, each sensor interferometer having a sensor imbalance, the method comprising:
    defining a plurality of transmission time intervals;
    dividing the plurality of transmission time intervals into a sequence of time-division multiplexing (TDM) repetition periods;
    defining a plurality of transmission time slots, wherein each transmission time slot comprises one of the transmission time intervals from each TDM repetition period located at the same position relative to the start of each TDM repetition period, the plurality of transmission time slots comprising pulse transmission time slots and dark transmission time slots located at the same positions within each TDM repetition period;
    transmitting optical signals from the transmitter unit, wherein optical pulses are transmitted during the pulse transmission time slots and no optical pulses are transmitted during the dark transmission time slots for the sequence of TDM repetition periods; and
    modulating a phase of the optical signals between at least one of the pulse transmission time slots and the dark transmission time slots such that unwanted interference signal components reaching the receiver unit are distributed to frequency bands that do not affect a demodulated sensor signal.

2. The method of claim 1, wherein the unwanted interference signal components comprise unwanted interference between a signal of one of the pulse transmission time slots and a signal of one of the dark transmission time slots.

3. The method of claim 2, wherein modulating the phase of the optical signals provides a shift in frequency of interference between the signal of one of the pulse transmission time slots and the signal of one of the dark transmission time slots away from frequency bands used for the demodulated sensor signal.

4. The method of claim 1, further comprising modulating a phase or a frequency of the optical pulses between TDM repetition periods such that the unwanted interference signal components reaching the receiver unit are distributed to frequency bands that do not affect the demodulated sensor signal.

5. The method of claim 4, wherein modulating the frequency of the optical signals comprises:
    applying a frequency shift between each TDM repetition period; and
    resetting the frequency shift to an initial frequency after a predetermined number of TDM repetition periods.

6. The method of claim 5, wherein the frequency shift is larger than a bandwidth of the receiver unit.

7. The method of claim 5, wherein the frequency shift is reset after at least $k_{max}$ repetition periods, wherein $k_{max} = \lfloor T_f / T \rfloor$, where $T$ is a period of one of the TDM repetition periods and $T_f$ is a maximum difference in delay from the transmitter unit to the receiver unit between a sensor pathway and any other pathway from the transmitter unit to the receiver unit that gives rise to unwanted interference at the receiver unit.

8. The method of claim 4, wherein modulating the frequency of the optical pulses comprises at least one of using a frequency shifter and tuning the frequency of a light source for producing the optical pulses.

9. The method of claim 4, wherein the unwanted interference signal components include unwanted interference between a signal of one of the pulse transmission time slots and a delayed signal of the same one of the pulse transmission time slots.

10. The method of claim 9, wherein the signal and the delayed signal are from the same TDM repetition period.

11. The method of claim 4, wherein the unwanted interference signal components include unwanted interference between a signal of one of the pulse transmission time slots and a delayed signal of another one of the pulse transmission time slots.

12. The method of claim 4, wherein modulating the phase of the optical pulses provides a shift in frequency of interference between a signal of one of the TDM repetition periods and a delayed signal of any other one of the TDM repetition periods away from the frequency bands used for the demodulated sensor signal.

13. The method of claim 4, wherein modulating the phase of the optical pulses includes applying a phase function that varies quadratically with time.

* * * * *

UNITED STATES PATENT AND TRADEMARK OFFICE
CERTIFICATE OF CORRECTION

PATENT NO. : 7,466,422 B2 Page 1 of 1
APPLICATION NO. : 11/866040
DATED : December 16, 2008
INVENTOR(S) : Waagaard et al.

It is certified that error appears in the above-identified patent and that said Letters Patent is hereby corrected as shown below:

Title Page, in the References Cited (56):
Please insert --5,971,597 A 10/1999 Baldwin et al.--;

In the Claims:
Column 14, Claim 7, Line 16, please delete "$T_f/$" and insert -- $T_f/$ -- therefor.

Signed and Sealed this

Fourth Day of August, 2009

JOHN DOLL
*Acting Director of the United States Patent and Trademark Office*